United States Patent [19]

Brown et al.

[11] 4,211,163

[45] Jul. 8, 1980

[54] APPARATUS FOR DISCHARGE OF PRESSURE COOKED PARTICULATE OR FIBROUS MATERIAL

[76] Inventors: Douglas B. Brown, 2104 Prince Charles Rd., Ottawa, Ontario, Canada, K2A 3L3; Robert Bender, 488 Denbury Ave., Ottawa, Ontario, Canada, K2N 2N7

[21] Appl. No.: 958,515

[22] Filed: Nov. 7, 1978

[51] Int. Cl.² .............................................. B30B 3/00
[52] U.S. Cl. ................................ 100/145; 99/323.4; 100/148; 426/448; 426/516; 426/635
[58] Field of Search ............... 100/145, 148, 249, 250, 100/251, DIG. 8, DIG. 3, DIG. 11; 99/323.4; 426/447, 448, 285, 512, 516, 635, 805

[56] References Cited

U.S. PATENT DOCUMENTS

| 1,922,313 | 8/1933 | Mason | 99/323.4 X |
| 2,915,957 | 12/1959 | Bowman | 99/323.4 |
| 3,084,620 | 4/1963 | Gibbons | 100/145 X |
| 3,202,084 | 8/1965 | Hale et al. | 99/323.4 X |
| 3,212,932 | 10/1965 | Hess et al. | 426/635 |
| 3,230,902 | 1/1966 | Grimm et al. | 100/145 X |
| 3,246,594 | 4/1966 | Fisher | 99/323.4 |
| 3,817,786 | 6/1974 | Algeo | 99/323.4 X |
| 3,862,594 | 1/1975 | Stolting et al. | 100/145 |
| 4,074,803 | 2/1978 | Kollberg | 100/145 X |
| 4,119,025 | 10/1978 | Brown | 100/145 X |

*Primary Examiner*—Stanley N. Gilreath

*Attorney, Agent, or Firm*—Hirons, Rogers & Scott

[57] ABSTRACT

Particulate or fibrous material, after treatment with gaseous reagents in a vessel under pressure in a continuous process, is discharged from the pressure vessel by entering a discharge conduit in pressure communication with the pressure vessel, and is conveyed through the discharge conduit by means of a feed conveyor located therein. The feed conveyor compacts the material to form a dense, substantially gas impervious plug thereof in the discharge conduit against the outlet end thereof. The outlet end of the discharge conduit comprises an exit passage of small cross-sectional area so as to cause compaction of the material therein by means of the conveyor. A valve means is provided, movable rapidly between a fully open position and a fully closed position to permit passage of the cooked material therethrough, from the dense, compact plug formed in the outlet end of the discharge conduit. Operating means is provided to move the valve rapidly between its fully open and fully closed positions, at predetermined intervals. In this means, the cooked material can be discharged intermittently at frequent intervals from a pressure vessel, allowing the pressure cooking process to be conducted continuously. The dense compact plug prevents reagent losses and pressure losses on discharge of the material. The process is particularly well adapted to the steam cooking of wood chips to produce fibrous cellulosic product.

5 Claims, 3 Drawing Figures

APPARATUS FOR DISCHARGE OF PRESSURE COOKED PARTICULATE OR FIBROUS MATERIAL

FIELD OF THE INVENTION

This invention relates to processes and apparatus for the treatment of materials with gaseous reagents under pressure, and more particularly to a method and apparatus for discharging solid materials in a finely divided condition from pressure vessels in which gaseous reagents are maintained under pressure.

BACKGROUND OF THE INVENTION

The need for chemical treatment of solid materials with gaseous reagents under conditions of elevated pressure and/or temperature arises in many processing applications. Examples include high pressure and temperature steam treatments of wood and wood pulp in pulp and paper manufacture and other utilizations of wood, the steam treatment of particulate materials of minerals such as gravel, stones and sand for cleaning and purifying processes, the treatment of mineral ores with gaseous reagents such as steam or acids to enrich the metal content thereof and aid in the extraction of metals therefrom, treatment of animal products with steam for rendering purposes, treatment of bitumens, coals, tar sands and other fuel values with gaseous reagents such as hydrocarbons for enrichment purposes, plasticizing treatments and the like. Where such processes are to be conducted continuously, and the product at the gaseous treatment is in a finely divided form, problems arise with the discharge of the finely divided product after treatment. Losses of gaseous reagent and gas pressures and temperatures from the pressurized reactor vessel as the treated product is continuously discharged therefrom need to be minimized, for economic reasons among others.

A typical example of such a process is the treatment of wood chips with steam at elevated pressures and temperatures, in a continuously operating pressurized steam digestor vessel, e.g. to prepare cellulose fibrous product. The resulting product is in finely divided fibrous form, and has a variety of different potential uses (insulation, animal fodder, etc.). The economics of the process require that the vessel be maintained at elevated temperatures and steam pressures, and that the fibrous product after treatment be continuously withdrawn from the vessel without excessive losses of steam pressures therefrom. The steam pressures in the vessel may be in the 200–300 psig range. The finely divided product materials must be discharged in such a manner that the physical nature of the product is not damaged, and that excessive wear and tear on apparatus parts is avoided.

SUMMARY OF THE INVENTION it is an object of the present invention to provide a novel means of discharging divided material (e.g. fibrous or particulate) from a pressurized cooking vessel.

According to the present invention, material after cooking in a pressure vessel under pre-selected, elevated pressures of gaseous reagents for the required time, is delivered in finely divided form from the pressure vessel to a discharge conduit, whilst still under the same gas pressures. The downstream end of the discharge conduit has a restricted, valved exit passageway therein. The cross-sectional area of the exit passage is considerably smaller than that of the discharge conduit. A conveyor is provided in the discharge conduit which moves the material delivered thereto towards the downstream end and compacts it against the downstream end in a compaction zone, to form a dense, compressed plug substantially impervious to the passage of reagent gases therethrough under the pressures experienced in the vessel and hence in the discharge conduit upstream of the plug. The exit conduit contains a valve which opens intermittently to permit a small amount of the material to exit. The valve is arranged to have an open position in which it presents an exit passage of substantially the same cross-sectional area as that of the exit conduit, to permit unobstructed materials discharged through the open valve. The valve is moved very rapidly between its closed position and its fully open position so that there is effectively no discharge of material through a half-open, obstructing valve.

These various features operate in combination with one another to form a discharge and decompression system which operates efficiently and economically. The formation of the dense, compact plug by the conveyor in the discharge conduit maintains the gas pressures upstream of the plug, e.g. in the pressure vessel, whilst the process is conducted continuously with intermittent material discharge. Gaseous reagent losses are effectively prevented at the discharge, thereby enhancing the economics of the process. The operation of the valve, to lie in a fully upon position or in a fully closed position, with substantially no time spent in intermediate, half-open positions, also contributes to this effective elimination of gaseous reagent losses on discharge of materials. The compact plug is being continuously formed by the conveyor in the discharge conduit. Upon each opening of the valve, the downstream wall or leading face of the compacted plug collapses due to its sudden exposure to reduced pressure conditions. Since the valve is moved extremely rapidly to its fully open position, substantially the whole downstream face area is exposed at the same time, and a portion of the plug transverse to the direction of compacting forces and extending over the whole cross-section collapses for discharge. The overall thickness of the plug is changed only to a small degree, and the barrier to gaseous reagent passage maintained. With a gradually opening valve, parts of the downstream face of the plug would be exposed to reduced pressure preferentially to and for longer periods than other parts, with the attendant problem of partial collapse of the plug in certain areas only, with the same areas being exposed preferentially repeatedly, on each opening of the valve. The result would be channelling through the length of the plug to distroy the seal of the plug against steam discharge. In addition, valve operation according to the invention reduces substantially the amount of wear experienced by the valve and hence prolongs its useful life. Impingement of particulate or fibrous materials on moving valve parts and against passageway-obstructing valve structures, with consequent wear thereof, is effectively reduced.

This mode of discharge according to the present invention has the additional advantage of allowing a greater degree of control of the processing times of material subject to reaction or treatment with pressurized gaseous reagents. With the substantially instantaneous movement of the discharge valve from its fully closed to its fully opened position, for a set period of time, small finite amounts of heated material pass through the valve, and thence to conditions of reduced pressure, with each valve opening. The discharged quantities thus decompress and cool by expansion, thereby stopping the treatment process, very rapidly. The residence time under treatment conditions of the materials is therefore closely controllable. This is in contrast to the situation where some material passes through a partly open, restricted valved outlet and some of the material passes through a fully open, unrestricted valved outlet. In such case, different portions of the material have different decompression and cooling times, so that the bulk of the material as a whole has an indefinite residence time under treatment conditions.

DESCRIPTION OF THE PREFERRED EMBODIMENTS

The process and apparatus of the present invention are particularly suitable for the steam pressure cooking of cellulosic fibrous materials such as good chips, e.g. in the preparation of animal fodder for ruminants. The fibrous nature of the material so produced, which is in finely divided form, compacts in the discharge conduit to form a suitably dense mass or plug, substantially impervious to the passage of steam therethrough. Moreover, the manner of discharge according to the invention has a beneficial effect upon the degree of digestibility of the fibrous product by ruminants, believed due to the resultant surface pore structure of the fibrous material.

In the preferred embodiment of the present invention, the rate of movement of the material through the pressurized treatment vessel and into the discharge conduit, the geometry of the discharge conduit and its conveyor, the speed of operation of the conveyor and the frequency of operation of the discharge valve, are all adjusted in relationship to one another, to obtain the desired processing conditions for the material. These parameters are preferably adjusted to achieve a bulk density of the compressed plug of material in the discharge conduit upstream of the exit passage in the range of from about 5 to about 20 pounds per cubic foot, preferably from about 10 to about 15 pounds per cubic foot, of equivalent oven dry material. The actual densities experienced in the discharge conduit will be higher than these values in many cases, because of the pressure of moisture in the material. The actual maximum should not exceed about 40 pounds per cubic foot, to avoid placing undue demands on the equipment. The minimum acceptable bulk density is that which will effectively prevent gas discharge through the exit conduit on opening of the valve, at the chosen pressures. This varies to some extent depending upon the nature of the material being cooked. As is well-known in the art, permeability to steam and the like, of a fibrous material such as steam cooked wood, increases steeply as the void space in the mass of the fibrous material decreases, in a manner which is characteristic of the particular material. There is of course a maximum degree of compaction which should not be exceeded in practice, or the structural strength of the compacted plug becomes too great for its collapse and discharge through the opened valve. Acceptable operating conditions will be found within the aforementioned bulk density ranges. The speed at which the valve moves from its fully closed position to its fully open position is faster than the speed at which the downstream end wall of the compacted plug breaks down, on exposure to atmospheric pressure conditions, to ensure that steam losses are substantially avoided. The speed and frequency of operation of the valve, the length of the discharge conduit, the speed of operation of the conveyor therein and the rate of feed of material from the pressure vessel to the discharge conduit, factors controlling the bulk density of the material immediately upstream of the valve, are all adjusted with this feature in view. As an example, the treatment time of the material may be within the range of 4–5 minutes, with the valve opening every ten-fifteen seconds, to balance the continuous treatment and intermittent discharging of the material. The preferred form of feed conveyor in the discharge conduit is an Archimedean screw conveyor, which can cause the necessary degree of compaction without undue shearing of the material.

Also in accordance with the preferred embodiment of the invention, throttling of the material, i.e. movement of the material from high pressure, processing conditions to atmospheric pressure conditions, with consequent expansion thereof, takes place at a location downstream of and remote from the valve itself. Suitably this is accomplished by the provision of a throttle tube downstream of the valve, of similar cross-section to the valve passageway, through which the material discharges from the valve to atmosphere.

The separation of throttling action and the discharge valve in the apparatus and process of the present invention is a further advantageous feature in the successful operation thereof. At the time of its compaction upstream of the discharge valve, and until it passes through the discharge valve, the material is still under treatment conditions, and is very hot. The passage of the material through the discharge valve effectively terminates the process, and the rate and frequency of operation of the valve, along with the size of its discharge aperture, is a significant factor in determining the residence time under treatment conditions of the material. In other words, the discharge valve modulates the flow rate in the continuous process. By separating the two features of discharge rate control, to be done solely by the valve, and throttling of the material, to be done downstream and remote from the valve, faster cooling rates are attainable. Prior art proposals tended to throttle the treated material across the discharge valve, with consequent loss of control and speed of cooling and expansion.

The flow characteristics of finely divided particulate or fibrous (i.e. semi solid) materials are different from those of fluid materials. One does not observe the same degree of continuity of flow over full control ranges of a discharge valve with semi solid material. Upon exit from the discharge valve, and exposure to reduction in pressure, the semi solid material will flow readily and easily through a fully open valve passageway, but not through a restricted valve passageway. Moreover, a high degree of turbulence in the discharge stream is created in the process of the present invention, where the valve means suddenly and rapidly to its fully opened position from its fully closed position. This turbulence is desirable, since it improves the heat dissipation from the material and leads to a rapid rate of cooling on discharge from the outlet tube. The amount of turbulence is controllable by changing the length of the outlet or throttle tube. Preferably, the length of the throttle tube is about three to five times the diameter of the valve outlet passageway. The separation of the discharge valve from the throttle in the preferred form of the invention separates the function of flow rate modulation, reserved to the valve, and expansion of the material. Erosion of the valve by contact with the turbulent stream of expanding material is thus avoided, further to prolong the useful life of the valve and reduce equipment maintenance costs.

The preferred form of valve for use in the present invention is a ball valve, in which the ball is rotatable by power means in a housing through a 90° or 180° angle, and has a diametric passageway extending therethrough, of substantially the same cross-sectional shape and area as that of the exit passage and throttle tube. Such a valve can be operated, e.g. by hydraulic or pneumatic actuating cylinders connected to its operating lever, or by standard electrical means, with timed actuation, sufficiently rapidly for use in the present invention. With such a valve, even when it is half way towards its open position, only ten percent of its fully open flow operation between its fully opened and fully closed position, makes such a valve eminently suitable for use in the present invention. A commercially available form of such a valve is a Kamyr Stellite-Seat Full Bore Valve.

In accordance with a further advantageous feature of the present invention, the creation of the compact plug immediately upstream of the discharge valve provides a beneficial and convenient location for addition to the treated material of chemical reagents. Thus, reagents can be added to the compacted plug immediately upstream of the discharge valve or elsewhere in the compacting zone of the discharge conduit. The dense nature of the plug effectively prevents blow back of the reagents into the pressure vessel, to interfere with the chemical treatment process therein. Mixing of the added reagents through the product will occur on passage through the discharge valve and turbulent flow in the throttle tube, whilst the material is still hot.

As noted above, the process of the invention is particularly suitable for the steam pressure cooking of wood chips, to produce cellulosic fibrous product, e.g. for use as animal fodder. In such case, the cooling of the cooked cellulosic material is best conducted by rapid adiabatic expansion of the cooked material, which occurs on throttling of the material. If cooling of the material from cooking temperatures to storage temperatures takes place too slowly, it has been found that the nutritive value and digestibility of the product decreases. This is believed to be due to changes which occur in the physical nature of the product on slow cooling. The pore sizes in the material become so small, if cooling is not conducted rapidly enough, that the ability of the desestion enzymes in the animal's digestive system to attack the material becomes impaired. Thus, it is desirable to "freeze" the cooked material in its open-pore, freshly cooked physical condition. The separation of the discharge valve and the throttling action are achieved in the preferred form of the invention by the provision of an outlet tube downstream of the valve, of substantially the same cross-sectional area and shape as that of the valve orifice and the exit passageway. Throttling thus takes place in the outlet tube and predominantly at the downstream end thereof.

A result of the steam digestion of substantially any hardwood material is the production therein of acetic acid. Ammonium acetate is a synthetic protein of nuitritional value to ruminant animals, although it is not of much use to humans. It is therefore of advantage to add ammonia to the cooked material in the vicinity of the compacted plug immediately upstream of the discharge valve. The addition of ammonia to the cooked product will thus produce ammonium acetate in situ and enhance the value of the product. However, it is important to prevent the added ammonia from entering the cooking digestor, where it will interfere with the steam cooking process.

BRIEF REFERENCE TO THE DRAWINGS

A specific preferred embodiment of the present invention as applied to the steam pressure cooking of wood, is illustrated diagrammatically in the accompanying drawings, in which.

DESCRIPTION OF THE SPECIFIC PREFERRED EMBODIMENT

Figure 1:
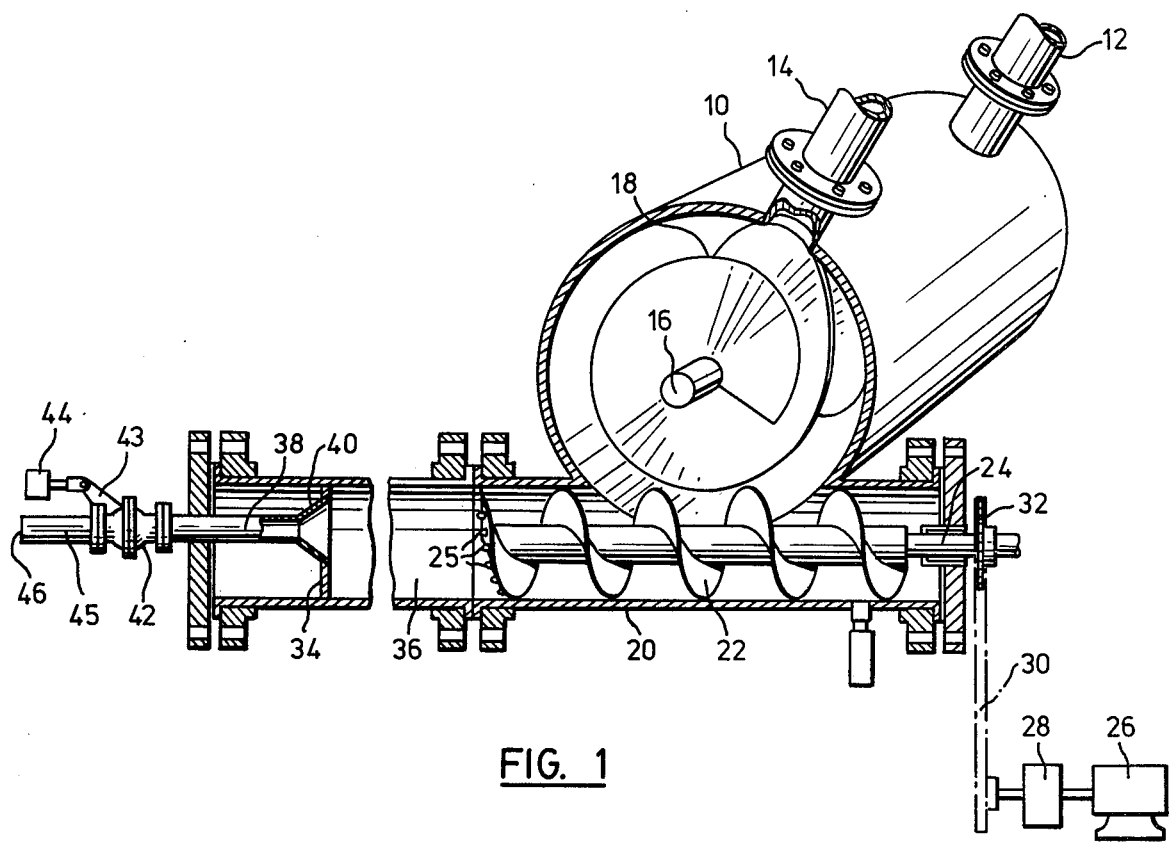
FIG. 1 is a cross-sectional view of an apparatus according to the present invention.

With reference to FIG. 1, there is diagrammatically illustrated therein a pressurized cooking vessel 10 in the form of a horizontally disposed cylinder having inlet and exhaust conduits 12, 14, a central rotating horizontal shaft 16 and a screw conveyor 18 secured to the shaft 16. In operation, wood chips or similar materials are continuously fed to vessel 10, cooked under suitable pressures of saturated steam therein, and continuously conveyed horizontally through vessel 10 by conveyor 18.

At one horizontal end, the vessel 10 communicates with a discharge conduit 20 in the form of a horizontal tube, which contains therein a horizontally mounted Archimedean screw conveyor 22, the peripheries of the flights of which are disposed in close proximity to the internal walls of the conduit 20. The screw 22 is mounted on a central horizontal rotating shaft 24, power driven by means of a motor 26, gear train 28, chain drive 30 and sprocket 32. The downstream flight of screw 22 is provided with axially projecting mastication teeth 25. Cooked woody material is delivered from cooking vessel 10 into the flights of screw conveyor 22, and then moved to the left as shown in FIG. 1, by screw conveyor 22. The discharge conduit 20 is in free communication with the interior of vessel 10, so that it is under the same pressures of saturated steam.

The screw 22 terminates some distance from the downstream end of 34 of conduit 20, leaving a zone 36 of the discharge conduit 20 unobstructed. At its downstream end 34, conduit 20 communicates with a material outlet comprising an exit passage 38 of small cross-sectional area, with a conical entrance 40 thereto. Downstream of the entrance 40, the exit passageway 38 is provided with a discharge valve 42, with an operating lever 43 and actuation means 44. Downstream of the valve 42 is a throttle tube 45 of substantially the same cross-sectional shape and area as that of exit passageway 38. Throttle tube 45 terminates in a discharge outlet end 46.

In the operation of the apparatus, the screw 20 feeds materials delivered thereto towards the downstream end 34 of conduit 20 and into exit passageway 38. As a result, a dense compact plug of fibrous material is formed in compacting zone 36 of conduit 20 and in exit passageway 38 before valve 42. Ammonia can be added to the product in zone 36 or passageway 38 if desired. Valve 42 opens suddenly and intermittently to allow a small amount of the compacted plug of material to exit to throttle tube 45 on each valve opening. The compact density of the plug of fibrous material prevents loss of steam pressures through the valve 42 when it opens. The material expands and cools adiabatically on passing out of outlet 46 from throttle tube 45, i.e. at a location remote from the valve 42. Flow rates, conveyor speeds, valve opening durations and frequencies are all adjusted to optimize the cooking process in vessel 10 and ensure a sufficiently compact, dense plug ahead of valve 42 to prevent steam losses.

Figure 2:
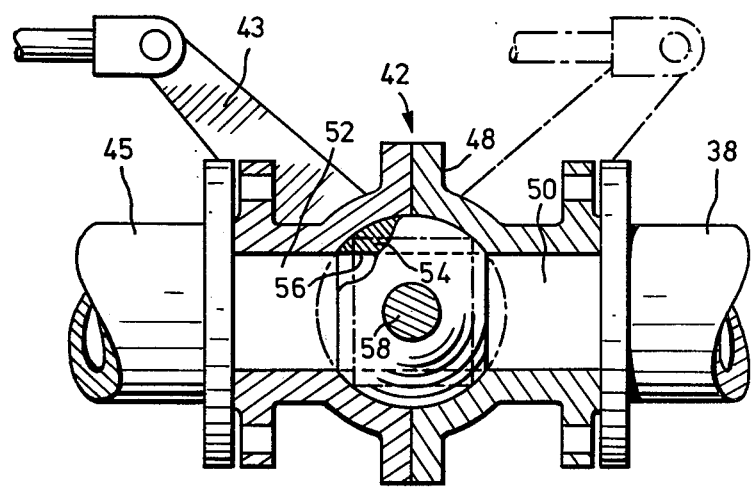
FIG. 2 is a side view, partly in section, of the valve of the apparatus of FIG. 1, in the open position.
Figure 3:
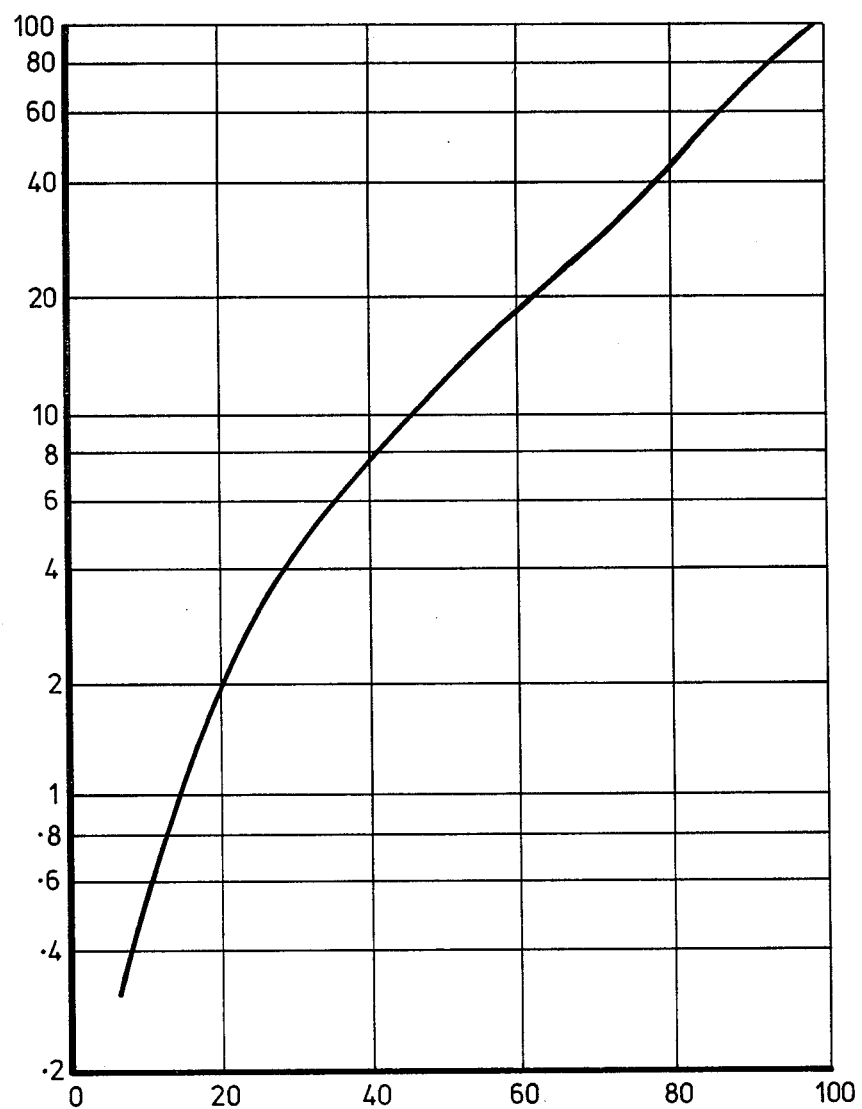
FIG. 3 is a graph showing the opening and closing characteristics of the valve of FIG. 2.

The valve 42 and its operation are illustrated in more detail in FIGS. 2 and 3. In FIG. 2, the valve is shown in its open position. The valve 42 comprises a housing 48 of part spherical form with respective inlet and outlet conduits 50,52 communicating therewith. The inlet and outlet conduits 50, 52 communicate with and are of substantially the same size as exit passageway 38 and throttle tube 45 respectively. A rotatable valve element 54 is mounted for rotation in the housing 48, the valve element 54 having a generally spherical periphery for rotation in the housing. The valve element has a bore 56 therethrough, of the same cross-sectional shape and size as inlet and outlet conduits 50, 52, and turns with central shaft 58 to bring the bore 56 into registry with conduits 50, 52 in the open position of valve 42. Operating lever 43 is connected to cause rotation of valve element 54. To close the valve 42, lever 43 moves through approximately 90 degrees to its position shown in broken lines in FIG. 2, with consequent rotation of valve element through 90 degrees, about the axis of shaft 58, to bring bore 56 completely out of registry with inlet and outlet conduits 50, 52 so as fully to close the valve.

FIG. 3 graphically illustrates the opening and closing characteristics of the valve of FIG. 2, with the percentage of material flow through the valve 42 plotted logarithmically as vertical axis against percentage of rotation of the valve element through its 90 degree opening and closing arc as horizontal axis.

From this curve it will be seen that, when the valve element is turned 20 percent through its arc from its closed to its open position, only 2 percent of the total flow of material through the valve is permitted. When the actuator is turned 50 percent towards its open position, about 12 percent of total flow is permitted. It is not until the valve actuator has turned about 84 percent of the way to its open position that as much as 50 percent of the total material flow through is permitted. These opening and closing characteristics, together with very rapid actuation of lever 43 through its 90 degree arc and similar such movement of the valve element 54, ensure that the valve is either fully upon or fully closed at substantially all times, and only for very brief intervals is a partially open valve, with an obstructed valve passage, presented to the downstream face of the compacted plug of material. In consequence, the plug face is suddenly presented with an open valve and reduced pressure exposure across substantially its whole face area, so that the entire face collapses to form an exit quantity of material to pass through the valve. Meanwhile the plug is rebuilt and compacted forwardly by the screw 20, until the valve opens again to permit exit of another quantity from the forward face thereof.

The operating means 44 for the valve 42 is preferably a pneumatic cylinder and piston connected to operating lever 44, and equipped with an adjustable timing device to cause very sudden and rapid movement of the piston under high pneumatic pressure. Such mechanisms are known and do not require a detailed description herein. Other suitable means can also be used, provided that they are capable of rapid movement to cause the valve to move rapidly between its fully open and fully closed positions.

What we claim is:

1. Apparatus for discharging cooked particulate or fibrous material from a pressurized vessel, which comprises:

a discharge conduit adapted to receive material from the pressurized vessel and being in pressure communication therewith, the discharge conduit having an upstream end, a downstream end and a materials compaction zone adjacent its downstream end;

a feed conveyor in said discharge conduit, adapted to feed material therein towards the downstream end of the discharge conduit and to cause compaction thereof in the compaction zone;

a materials outlet at the downstream end of the discharge conduit, said materials outlet comprising an exit passage of small cross-sectional area as compared with that of the discharge conduit so as to cause compaction of material in the compaction zone by said feed conveyor;

valve means in said exit passage, said valve means being movable rapidly between a fully open position and a fully closed position to permit passage of said material therethrough;

operating means for said valve means adapted to move the valve means rapidly between its fully open and fully closed position, at predetermined intervals, to allow intermittent passage therethrough of cooked materials.

2. Apparatus according to claim 1 wherein said valve means in its fully open position presents an outlet therethrough of substantially the same cross-sectional shape and area as that of the exit passage.

3. Apparatus according to claim 2 wherein said feed conveyor comprises an Archimedean screw adapted to be rotated to move the fibrous material downstream in said discharge conduit and compact the material in the compaction zone thereof.

4. Apparatus according to claim 1 wherein the valve means comprises a ball valve having a valve element therein which is rotatable between a valve open and a valve closed position, said valve element having a passageway therethrough which registers with the exit passage when the valve is in the fully open position, the passageway through said valve element being of substantially the same cross-sectional shape and area as that of the exit passage.

5. Apparatus according to claim 4 including a throttle tube extending downstream of said valve and in communication with the outlet side thereof, said throttle tube being of substantially the same cross-sectional shape and area as that of the passageway through the valve element.

* * * * *